United States Patent
Duma et al.

(10) Patent No.: US 10,584,288 B2
(45) Date of Patent: Mar. 10, 2020

(54) EXTRUDED RESID DEMETALLATION CATALYST

(71) Applicant: Advanced Refining Technologies LLC, Columbia, MD (US)

(72) Inventors: Viorel D. Duma, Hercules, CA (US); Matthew P. Woods, Baltimore, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

(21) Appl. No.: 14/379,137

(22) PCT Filed: Feb. 14, 2013

(86) PCT No.: PCT/US2013/026108
§ 371 (c)(1),
(2) Date: Aug. 15, 2014

(87) PCT Pub. No.: WO2013/123166
PCT Pub. Date: Aug. 22, 2013

(65) Prior Publication Data
US 2016/0017240 A1  Jan. 21, 2016

Related U.S. Application Data

(60) Provisional application No. 61/600,022, filed on Feb. 17, 2012.

(51) Int. Cl.
| | |
|---|---|
| C01G 45/10 | (2006.01) |
| C10G 45/10 | (2006.01) |
| B01J 37/03 | (2006.01) |
| B01J 21/06 | (2006.01) |
| B01J 35/10 | (2006.01) |
| C10G 45/08 | (2006.01) |
| B01J 27/19 | (2006.01) |
| B01J 37/02 | (2006.01) |
| B01J 37/00 | (2006.01) |
| B01J 23/24 | (2006.01) |
| B01J 23/40 | (2006.01) |
| B01J 23/652 | (2006.01) |
| B01J 23/74 | (2006.01) |
| B01J 23/85 | (2006.01) |
| B01J 27/185 | (2006.01) |
| B01J 27/188 | (2006.01) |
| B01J 37/08 | (2006.01) |
| C10G 45/06 | (2006.01) |

(52) U.S. Cl.
CPC ............ *C10G 45/10* (2013.01); *B01J 21/063* (2013.01); *B01J 23/24* (2013.01); *B01J 23/40* (2013.01); *B01J 23/652* (2013.01); *B01J 23/74* (2013.01); *B01J 23/85* (2013.01); *B01J 27/185* (2013.01); *B01J 27/188* (2013.01); *B01J 27/19* (2013.01); *B01J 35/1014* (2013.01); *B01J 35/1019* (2013.01); *B01J 35/1042* (2013.01); *B01J 35/1047* (2013.01); *B01J 35/1061* (2013.01); *B01J 35/1066* (2013.01); *B01J 35/1071* (2013.01); *B01J 37/0009* (2013.01); *B01J 37/0201* (2013.01); *B01J 37/0205* (2013.01); *B01J 37/031* (2013.01); *B01J 37/08* (2013.01); *C10G 45/06* (2013.01); *C10G 45/08* (2013.01); *C10G 2300/1033* (2013.01); *C10G 2300/1077* (2013.01); *C10G 2300/202* (2013.01)

(58) Field of Classification Search
None
See application file for complete search history.

(56) References Cited

U.S. PATENT DOCUMENTS

| | | | |
|---|---|---|---|
| 3,401,125 A | 9/1968 | Jaffee | |
| 3,524,808 A * | 8/1970 | van Weeren | B01J 21/04 208/111.05 |
| 3,956,105 A | 5/1976 | Conway | |
| 4,066,574 A | 1/1978 | Tamm | |
| 4,113,661 A | 9/1978 | Tamm | |
| 4,116,882 A | 9/1978 | Bendig et al. | |
| 4,152,250 A * | 5/1979 | Inooka | B01J 21/14 208/213 |
| 4,154,812 A | 5/1979 | Sanchez et al. | |

(Continued)

FOREIGN PATENT DOCUMENTS

| | | |
|---|---|---|
| CN | 1050736 A | 4/1991 |
| CN | 101890380 A | 11/2010 |

(Continued)

OTHER PUBLICATIONS

International Search Report and Written Opinion for Application No. PCT/US13/46753 dated Nov. 14, 2013.

(Continued)

*Primary Examiner* — Stefanie J Cohen

(74) *Attorney, Agent, or Firm* — Lerner, David, Littenberg, Krumholz & Mentlik, LLP

(57) ABSTRACT

Catalyst supports, supported catalysts, and a method of preparing and using the catalysts for the demetallation of metal-containing heavy oil feedstocks are disclosed. The catalyst supports comprise alumina and 5 wt % or less titania. Catalyst prepared from the supports have at least 30 to 80 volume percent of its pore volume in pores having a diameter of between 200 and 500 angstroms. Catalysts in accordance with the invention exhibit improved catalytic activity and stability to remove metals from heavy feedstocks during a hydroconversion process. The catalysts also exhibit increased sulfur and MCR conversion.

13 Claims, No Drawings

(56) References Cited

U.S. PATENT DOCUMENTS

| | | | |
|---|---|---|---|
| 4,179,408 A | 12/1979 | Sanchez et al. | |
| 4,270,779 A | 6/1981 | Watts | |
| 4,341,625 A | 7/1982 | Tamm | |
| 4,440,631 A * | 4/1984 | Togari | B01J 23/22 208/112 |
| 4,465,790 A | 8/1984 | Quayle | |
| 4,568,657 A | 2/1986 | Sepulveda et al. | |
| 4,686,030 A | 8/1987 | Ward | |
| 4,976,848 A | 12/1990 | Johnson | |
| 5,089,463 A | 2/1992 | Johnson | |
| 5,215,955 A | 6/1993 | Threlkel | |
| 5,229,347 A | 7/1993 | Prada et al. | |
| 5,435,908 A | 7/1995 | Nelson et al. | |
| 5,545,602 A | 8/1996 | Nelson et al. | |
| 5,888,380 A | 3/1999 | Fujita et al. | |
| 6,036,847 A | 3/2000 | Ziebarth et al. | |
| 6,383,975 B1 | 5/2002 | Rocha et al. | |
| 8,025,532 B2 | 9/2011 | Nagata et al. | |
| 9,067,191 B2 | 6/2015 | Seki et al. | |
| 2005/0234137 A1 | 10/2005 | Espinoza et al. | |
| 2006/0011510 A1 | 1/2006 | Toshima et al. | |
| 2006/0025608 A1 | 2/2006 | Hutchenson et al. | |
| 2010/0279854 A1 | 11/2010 | Kuperman et al. | |
| 2011/0218097 A1 | 9/2011 | Rayo Mayoral et al. | |
| 2012/0181219 A1 | 7/2012 | Seki et al. | |

FOREIGN PATENT DOCUMENTS

| | | | |
|---|---|---|---|
| CN | 101890382 A | 11/2010 | |
| CN | 102197115 A | 9/2011 | |
| EP | 0339640 A1 | 11/1989 | |
| EP | 0512778 A1 * | 11/1992 | C10G 47/02 |
| GB | 1569525 A | 6/1980 | |
| GB | 2121699 A | 1/1984 | |
| JP | S53119800 A | 10/1978 | |
| JP | 58-219293 | 12/1983 | |
| JP | 02014818 | 1/1990 | |
| JP | 5192575 A | 8/1993 | |
| JP | 06-200261 A | 7/1994 | |
| JP | H10118495 A | 5/1998 | |
| JP | 2003181292 A | 7/2003 | |
| JP | 2004148139 A | 5/2004 | |
| JP | 2008503611 A | 2/2008 | |
| WO | 2010033487 A2 | 3/2010 | |
| WO | 20110040224 A1 | 4/2011 | |
| WO | 20130123166 A1 | 8/2013 | |

OTHER PUBLICATIONS

English translation JP02014818.
International Search Report for Application No. PCT/US2013/026323 dated Apr. 26, 2013.
Santes, Victor et al.: "Catalytic hydrotreating of heavy gasoil FCC feed on alumina-titania-supported NiMo catalysts", Applied Catalysis A: General, vol. 281, (2005), pp. 121-128.
S.K. Maity et al.: "Alumina-titania binary mixed oxide used as support for hydrotreating of Maya heavy crude", Applied Catalysis A: General, vol. 244, (2003), No. 30, pp. 141-153, (30.153.141).
Brunauer et al., "Adsorption of gases in multimolecular layers", Emmett and Teller in J. Am. Chern. Soc. 60 (1938) 309-319.
International Search Report for Application No. PCT/US2013/026108 dated Apr. 26, 2013.
Wenyuan Ye et al., Comparison of hydrodesulfurization schemes for residue feedstock with high contents of sulfur, metal and carbon residue, Petroleum Processing and Petrochemicals, Jun. 30, 1995, vol. 26, No. 6, pp. 26-31 (English translation of Abstract provided.).
Fuqiang Deng et al., Application of ultra-fine supported Ni—Mo/Al2O3 catalyst in residue hydrocracking, Petroleum Refinery Engineering, May 31, 2010, pp. 47-50 (English translation of Abstract provided.).
Ramirez J et al, "Titania-Alumina Mixed Oxides as Supports for Molybdenum Hydrotreating Catalysts", Applied Catalysis A: General, Elsevier Science, Amsterdam, NL, (Jan. 1, 1993), vol. 93, No. 2, XP001181704, pp. 163-180.

* cited by examiner

EXTRUDED RESID DEMETALLATION CATALYST

CROSS REFERENCE TO RELATED APPLICATIONS

The present application is a national phase entry under 35 U.S.C. § 371 of International Application No. PCT/US2013/026108 filed Feb. 14, 2013, published in English, which claims priority from U.S. Provisional Patent Application No. 61/600,022 filed Feb. 17, 2012, all of which are incorporated herein by reference.

FIELD OF THE INVENTION

The present invention relates to the catalytic hydrotreating of liquid hydrocarbon containing feed streams. In particular, the present invention relates to a catalyst carrier, catalyst compositions prepared using the carrier, a method of preparing the catalyst compositions and a process of reducing metals content of a hydrocarbon heavy feedstock using the aforementioned catalyst compositions.

BACKGROUND OF THE INVENTION

In the petroleum refining industry it is often useful to upgrade certain oil and fractions like heavy oils and residuum by hydrotreating. Examples of such hydrotreating processes are hydrodemetallation, hydrodesulfurization, and hydrodenitrogenation. In these processes the feedstock is contacted with a hydroconversion catalyst in the presence of hydrogen at elevated pressure and temperature. Due to strict demands imposed by ecological regulations, the refining industry has become increasingly more focused on producing cleaner fuels with high quality and with a minimum content of contaminants such as sulfur, nitrogen and heavy metals.

Catalysts used in hydrotreating processes generally comprise catalytically active metals from Groups 6, 9 and 10 of The Periodic Table and are typically supported on alumina which may be combined with other inorganic refractory materials such as silica, magnesia, titania, zirconia and the like. Secondary promoters or additives such as halogens, phosphorus and boron, have also been used to enhance catalytic properties. To achieve the maximum effect from hydrotreating processes, it is necessary to optimize catalyst activity and selectivity to a desired hydrotreating reaction. Catalyst activity and selectivity is determined and affected by such factors as the nature and properties of the catalyst support, the catalytic agents, activity and selectivity of promoters as well as the preparation and activation method used.

Where heavy feedstocks contain organometallic compounds, the effectiveness of the hydrotreating as well as downstream catalysts tend to decline relatively rapidly, particularly when the impurity is more than about 10 to 20 ppm metals such as dissolved nickel and vanadium. These metallic impurities are said to deposit on the surface and in the pores of these catalysts reducing their effectiveness. One approach to the problem of metal impurity has been to alter the pore structure of the hydrotreating catalyst. However, the determination as to which pore structure to use is unpredictable and not easily obtained. There is yet a conflict in the art regarding optimal pore structure. Several patents which have discussed this conflict include U.S. Pat. Nos. 4,066,574; 4,113,661 and 4,341,625.

Hydrotreated hydrocarbon feedstocks having a low Conradson carbon residue (CCR) are also highly desirable in the refining industry. Carbon residue is a measurement of the tendency of a hydrocarbon to form coke. Expressed in weight percent, carbon residue may be measured as microcarbon residue (MCR). The MCR content in a hydrotreated residual feedstock is an important parameter since the hydrotreated residue usually acts as feed to a coker or the fluid catalytic cracking (FCC) unit. Decreasing the MCR content in a hydrotreated residue decreases the amount of low value coke generated in the coker and increases the amount of gasoline generated in the FCC unit.

To this end, there remains a need to develop catalyst compositions that are less expensive and/or more effective in removing metal and/or sulfur contaminants from hydrocarbons feed streams, in particularly heavy hydrocarbon feed streams, during a hydrotreating processes. There also remains a need for improved hydrodemetallation and/or hydrodesulfurization catalysts which provide good MCR conversion during a hydrotreating process.

SUMMARY OF THE INVENTION

The present invention is based on the discovery that the high temperature calcination of a titania alumina containing 5 wt % or less titania, based on the total weight of the titania alumina, unexpectedly provide extruded catalyst supports having a unique pore structure from which supported catalysts having increased catalytic activity and stability to remove metals during a hydrotreating process may be prepared. Advantageously, the supports of the invention offer the economical benefit of lower cost since catalyst compositions prepared therefrom generally uses a lower catalytically active metal content while maintaining high catalytic performance.

In an aspect of the present invention, an extruded titania alumina support having a distinct pore structure is provided. The support of the invention has a pore size distribution as determined by mercury penetration porosimetry satisfying the following: total pore volume in the range of from about 0.7 to about 1.2 cc/g, with greater than 40% of the total pore volume having pores in a diameter larger than 200 Å, about 30% or more of the total pore volume having pores in the range of about 200 Å to about 500 Å and, greater than 10% of the total pore volume having pores with a diameter above 1000 Å.

The present invention also provides extruded titania alumina support which comprises at least 90 wt % of a titania alumina having an alumina R value of from about 0.4 to about 1.7, the R value being defined as the ratio between the integrated intensity of the X-ray diffraction peak at $2\theta=32°$ and the integrated intensity of the X-ray diffraction peak at $2\theta=46°$.

In another aspect of the present invention is provided improved hydrotreating catalysts for reducing the content of metals in a heavy hydrocarbon feed stock containing metals during a hydrotreating process. Catalysts in accordance with the present invention are prepared by impregnating catalytically active Group 6, 9 and 10 metals or precursor metal compounds, and optionally, phosphorus compounds, on an extruded support in accordance with the invention.

In still another aspect of the present invention is provided improved hydrotreating catalysts which have the ability to reduce the content of metals while simultaneously reducing the content of sulfur and microcarbon residue (MCR) in a hydrotreated heavy hydrocarbon fraction.

The present invention also provides a method of making an extruded titania alumina support having a distinctive pore size distribution.

Another aspect of the present invention provides a method of making a catalyst composition comprising an extruded titania alumina support, which support comprises at least 90 wt % of a titania alumina having an alumina R value of from about 0.4 to about 1.7 and containing 5 wt % or less titania, based on the total weight of titania alumina.

In yet another aspect of the present invention an improved hydrotreating process using supported catalyst compositions and processes in accordance with the present invention is provided.

These and other aspects of the present invention are described in further details below.

DETAILED DESCRIPTION OF THE INVENTION

The present invention provides catalyst compositions comprised of catalytically active metals or precursor metal compounds of metals of Groups 6, 9 and 10 of The Periodic Table, and optionally phosphorus compounds, supported on an extruded titania alumina support. In one embodiment of the invention, the support material used to prepare the catalyst of the invention comprises titania alumina containing 5 wt % or less titania, based on the total weight of the titania alumina composition. In another embodiment of the invention, the support material comprises less than 5 wt % titania, based on the total weight of the titania alumina composition. In still another embodiment of the invention the support material comprises from about 2.5 to about 4 wt % titania, based on the total weight of the titania alumina composition. In yet another embodiment of the invention, the support material comprises from about 0.3 to about 1 wt % titania, based on the total weight of the titania alumina composition.

In a preferred embodiment of the invention, the titania alumina used to prepare the support of the invention comprises at least 90 wt % of an alumina having a mixture of gamma-alumina and delta- and/or theta-alumina, such that the titania alumina composition is reflected by an alumina R value in the range of from about 0.40 to about 1.7, preferably from about 0.6 to about 1.4. The term "R value" as used herein is used to indicate the ratio between the integrated intensity of the X-ray diffraction peak at $2\theta=32°$ and the integrated intensity of the X-ray diffraction peak at $2\theta=46°$. R values are determined by a method as disclosed and described in U.S. Pat. No. 5,888,380, the entire contents of which is herein incorporated by reference.

The R value can be expressed in by the formula:

$$R = \frac{[I(2\theta) = 32°]}{[I(2\theta) = 46°]}$$

in which $[I(2\theta)=32°]$ and $[I(2\theta)=46°]$ stand for the integrated intensity of the peak at a $2\theta$ angle of the X-ray diffraction spectrum at 32° and 46°, respectively. In the present specification, use is made of a PANalytical X'Pert X-RAY DIFFRACTOMETER. The following measurement conditions and apparatus were used: CuK alpha-ray vessel, vessel voltage 50 kV, vessel current 30 mA, double axis vertical goniometer, scanning rate 0.867°/min, emitting slit width 1°, scattering slit width, 1°, receiving slit width 0.3 mm, $2\theta$ angle $4°\leq 2\theta \leq 82°$. The peak which appears at $2\theta=46°$ is due to gamma-alumina, while the peak appearing at $2\theta=32°$ is due to delta- and/or theta-alumina. At this angle the latter two alumina types cannot be distinguished from each other by way of X-ray diffraction. The two peaks at $2\theta=46°$ and $2\theta=32°$ do not overlap and can therefore be readily integrated to calculate the integrated intensity. In calculating the integrated intensity, the background intensity is not taken into account, as is well known to the person skilled in the art.

In this respect it is noted that the R value should be determined on a support on which no catalytically active metals are present.

Titania alumina supports in accordance with the present invention generally comprise at least 90 wt % of titania alumina as described herein. Preferably, the support material comprises at least 95 wt %, most preferably, greater than 99 wt % of the titania alumina, said weight percent being based on the total weight percent of the support. The support material thus can "consist essentially of" the titania alumina as described herein. The phrase "consist essentially of" as used herein with regard to the composition of the support material is used herein to indicate that the support material may contain the titania alumina and other components, provided that such other components do not materially affect or influence the catalytic properties of the final hydroconversion catalyst composition.

Advantageously, titania alumina supports in accordance with the present invention possess specific properties of surface area, pore volume and pore volume distribution. Unless otherwise specified herein, the pore volume and pore size distribution properties of the titania alumina supports as defined herein are determined by mercury penetration porosimetry. The mercury measurement of the pore volume and the pore size distribution of the alumina support material is performed using any suitable mercury porosimeter capable of a pressure range of atmospheric pressure to about 4,000 bar, with a contact angle, $\theta=140°$, with a mercury surface tension of 0.47 N/m at room temperature.

Surface area as defined herein is determined by BET surface area analysis. The BET method of measuring surface area has been described in detail by Brunauer, Emmett and Teller in *J. Am. Chem. Soc.* 60 (1938) 309-319, which is incorporated herein by reference.

The surface area of titania alumina supports of the invention ranges from about 50 m²/g to about 150 m²/g. In a preferred embodiment of the invention, the surface area of the titania alumina supports ranges from about 90 m²/g to about 140 m²/g.

Titania alumina supports of the invention have a total pore volume in the range from about 0.7 cc/g to about 1.2 cc/g. In one embodiment of the invention, the total pore volume of the supports ranges from about 0.8 cc/g to about 1.0 cc/g.

Supports of the invention have a distinct pore volume distribution such that generally greater than 40% of the total pore volume have pores in a diameter larger than 200 Å, with about 30% or greater of the total pore volume having pores in a diameter in the range of about 200 Å to about 500 Å and, greater than 10% of the total pore volume having pores with a diameter above 1000 Å.

In an embodiment of the invention, about 50% to about 90% of the total pore volume of the supports has pores with a diameter larger than 200 Å.

In one embodiment of the invention, about 30% to about 80% of the total pore volume of the supports has pores with a diameter in the range of about 200 Å to about 500 Å.

In another embodiment of the invention, about 15% to about 60% of the total pore volume of the support have pores with a diameter over 500 Å.

In yet another embodiment of the invention, greater than about 15 wt % of the total pore volume of the support has pores in a diameter above 1000 Å.

Titania alumina supports of the invention may be prepared by any conventional method of forming titania alumina supports provided however that the final support materials comprise titania alumina having 5 wt % or less titania and have the desired pore structure. Generally, supports in accordance with the present invention are prepared by forming an extrudable titania alumina powder comprising 5 wt % or less titania; optionally peptizing the titania alumina powder; extruding the titania alumina powder to form an extruded material; and thereafter calcining the extruded material at a temperature ranging from about 960° C. to about 1050° C., preferably 980° C. to about 1040° C., for about 1 hour to about 3 hours to form a support having a pore size distribution as described herein above.

In one embodiment of the invention, titania alumina supports in accordance with the present invention are prepared by co-precipitating aqueous alumina sulfate and an amount of titanyl sulfate sufficient to provide 5 wt % or less titania in a co-precipitated titania alumina powder. In accordance with this embodiment, alumina sulfate and titanyl sulfate are mixed with an aqueous stream containing sodium aluminate and held at a pH of about 7.5 to about 10.0 and a temperature of about 50° C. to about 80° C. to precipitate a titania alumina powder. The precipitated powder is filtered, washed with water and dried at a temperature ranging from about 100° C. to about 150° C. until a powder with a moisture content of 20 wt % to 40 wt %, as analyzed by a moisture analyzer at 955° C., is achieved.

The dried titania alumina powder is thereafter treated with a peptizing agent to peptize the alumina powder. Suitable peptizing agents include but are not limited to, strong monobasic acids such as nitric acid or hydrochloric acid, organic acids such as formic acid, acetic acid or propionic acid and aqueous bases such as ammonium hydroxide. The peptized powder is extruded and dried at a temperature ranging from about 100° C. to about 150° C. for about 10 minutes to about 2 hours.

The dried extrudate is thereafter calcined at a high temperature ranging from about 960° C. to 1050° C. for about 1 hour to about 3 hours to obtain a final support having the required pore structure. Preferably, the dried extrudate is calcined at a temperature ranging from about 980° C. to about 1040° C. to obtain the final support.

In another embodiment of the invention, a titania alumina support of the invention is prepared by co-mulling or co-mixing a precipitated alumina powder having the desired R value with a titania source to form a titania alumina powder containing 5 wt % or less titania. Suitable sources of titania useful to prepare the titania alumina powder include, but is not limited to, fumed titania, precipitated titania, and the like. The titania alumina powder is thereafter optionally peptized with a peptizing agent, e.g. nitric acid, and the like. The resulting powder is then extruded to form a titania alumina extrudate. The titania alumina extrudate is calcined at a high temperature ranging from about 960° C. to about 1050° C., preferably from about 980° C. to about 1040° C., for about 1 hour to about 3 hours to provide the final catalyst supports.

In yet another embodiment of the invention, the titania alumina supports are prepared by impregnating an alumina powder having the desired R value (preferably a precipitated alumina) with an aqueous solution of a titanium containing compound in an amount sufficient to provide 5 wt % or less titania on the alumina. Suitable titanium containing compounds include, but are not limited to, titanium sulfate, titanium chloride, titanium phosphate, titanium alkoxides and the like. The resulting titania alumina is extruded and dried at a temperature ranging from about 100° C. to about 150° C. for about 10 minutes to about 2 hours. The dried titania alumina extrudate is thereafter calcined at a high temperature ranging from about from about 960° C. to about 1050° C., preferably from about 980° C. to about 1040° C., for about 1 hour to about 3 hours to provide the final catalyst supports.

Extruded supports in accordance with the invention may have various geometric forms, such as cylinders, rings, and symmetric and/or asymmetric polylobes, for instance, tri- or quadrulobes. Nominal sizes of the extrudates may vary. The diameter usually ranges from about 1 to about 10 mm, and the length ranges from about 1 to about 30 mm. In one embodiment of the invention, the diameter ranges from about 1 to about 2 mm and the length ranges from about 2 to about 6 mm. As will be understood by one skilled in the catalyst arts, catalyst particles produced from the supports will have a similar size and shape as the support.

Catalysts in accordance with the invention are prepared by contacting the titania alumina supports with an aqueous solution of at least one catalytically active metal or precursor metal compound to uniformly distribute the desired metal on the support. Preferably, the metal is distributed uniformly throughout the pores of the support. In a preferred embodiment of the invention, the catalysts are prepared by impregnation of the catalyst supports to incipient wetness with an aqueous solution of the desired catalytically active metal or precursor compound.

Catalytically active metal and/or precursor metals compounds useful to prepare the catalyst composition of the invention, include, but are not limited to metals or compounds of metals selected from the group consisting of Group 6 of The Periodic Table, Group 9 of The Periodic Table, Group 10 of The Periodic Table and combinations thereof. Preferred Group 6 metals include, but are not limited to, molybdenum and tungsten. Preferred Groups 9 and 10 metals include, but are not limited to, cobalt and nickel.

In a preferred embodiment of the invention the combinations of nickel and molybdenum catalytic agents are preferred. In a more preferred embodiment of the invention, the resulting catalyst comprises Mo concentrations in the range of about 4 to about 6 wt % and Ni concentrations in the range of about 0.1 to about 1 wt %, said wt % being based on the total catalyst composition.

Suitable precursor metal compounds of Groups 9 and 10 metals include, but are not limited to, metallic salts such as nitrates, acetates and the like. Suitable precursor metal compounds of Group 6 compounds include, but are not limited to, ammonium molybdate, molybdic acid, molybdenum trioxide, and the like.

Catalytically active metals contemplated for use with the supports of the present invention are preferably used in the form of oxides and/or sulfides of the metals. Preferably, the catalytically active metals are used in the form of oxides.

Catalyst compositions of the invention may also comprise a phosphorus component. In this case, the impregnating solution may also contain a phosphorus compound, e.g. phosphoric acid, phosphates, and the like, in addition to desired catalytically active metals or precursor metal compounds. Concentrations in the range of about 0.1 to about 1 wt % of phosphorus based on the total catalyst composition are suitable for use in the catalysts of the invention.

Following treatment of the supports with aqueous solutions of the catalytically active metal/s or precursor compound/s, the catalyst are optionally dried at a temperature in the range of about 100° C. to about 200° C. for about 10 minutes to about 2 hours. The dried catalyst is thereafter calcined at a temperature and for a time sufficient to convert at least part, preferably all, of the metal components or precursors to the oxide form, i.e., in the range of about 300° C. to about 600° C. for about 1 hour to about 3 hours.

As will be clear to a person skilled in the art, there is a wide range of variations on the impregnating method used to support the catalytic active metals on the catalyst supports. It is possible to apply a plurality of impregnating steps or the impregnating solutions may contain one or more of the component or precursors to be deposited, or a portion thereof. Instead of impregnating techniques, dipping methods, spraying methods and the like can be used. In the case of multiple impregnations, dipping, and the like, drying and/or calcining may be carried out as between steps.

Catalysts according to the invention exhibit an increased catalytic activity and stability for hydrodemetallation of a heavy hydrocarbon feedstock containing metals during a hydrotreating process. The heavy hydrocarbon feedstock useful in the present invention can be obtained from any suitable source of hydrocarbons, including, for example, petroleum crude oils and tar sand hydrocarbons, such as, the heavy oils extracted from tar sand. The heavy hydrocarbon feedstock can be a vacuum resid or atmospheric resid component of a petroleum crude oil or a tar sand hydrocarbon. The heavy hydrocarbon feedstock may also include light and heavy gas oils, as well as petroleum crude oil, atmospheric residues and vacuum residues blended with gas oils, particularly vacuum gas oils, crudes, shale oils, and tar sand oils.

The heavy hydrocarbon feedstock generally will include a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. (650° F.). The heavy hydrocarbon feedstock is thus defined as having a boiling range, as determined by ASTM test procedure D-1160, such that at least about 20 wt % of the heavy hydrocarbon feedstock boils at a temperature exceeding 524° C. (975° F.). The preferred heavy hydrocarbon feedstock has a boiling range such that at least 30 wt % boils at a temperature exceeding 524° C. (975° F.), and, most preferably, at least 40 wt % of the heavy hydrocarbon feedstock boils at a temperature exceeding 524° C. (975° F.).

The API gravity of the heavy hydrocarbon feedstock can range from about 3 to about 20, but, more specifically, the API gravity is in the range of from 4 to 15, and, more specifically, from 4 to 11.

The heavy hydrocarbon feedstock can have a Conradson carbon residue content, as determined by ASTM testing method D-189, exceeding 5 weight percent and, more specifically, the Conradson carbon residue content is in the range of from 8 weight percent to 30 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 500 ppmw. The vanadium concentration in the heavy hydrocarbon feedstock can exceed 50 ppmw or it can exceed 100 ppmw. More specifically, the vanadium concentration in the heavy hydrocarbon feedstock can be in the range of from 150 ppmw to 1500 ppmw.

Catalysts of the invention are also useful to increase the removal of sulfur simultaneously with demetallation during a hydrotreating process where the hydrocarbon feedstock being treated contains both sulfur and metals. The sulfur content of the feed is generally above 0.1 wt. % and will frequently be more than 1 wt. %. The nitrogen content is generally above 500 ppm and will frequently be in the range of from 500 ppm to 4000 ppm.

Further, catalysts in accordance with the present invention provide an increased micro carbon residue (MCR) conversion during a hydrotreating process as compared to prior demetallation and/or desulfurization catalysts prepared from alumina or aluminia titania supports where the supports were calcined at a low temperature (i.e. below 960° C.). Consequently, the hydrotreated hydrocarbon fraction obtained exhibits a reduced MCR content as compared to the MCR content of the starting heavy hydrocarbon feedstock.

A hydrotreating process employing the catalyst compositions of this invention may be carried out under hydrotreating process conditions in an apparatus whereby an intimate contact of the catalyst composition with said metal containing feedstock and a free hydrogen containing gas is achieved, to produce a hydrocarbon-containing product having a reduced level of metals, e.g. nickel and vanadium, and, optionally sulfur. In accordance with the invention, the hydrotreating process can be carried out using a fixed catalyst bed. The hydrotreating process can be carried out as a batch process or, as a continuous process containing one or more fixed catalyst beds or in a plurality of fixed bed reactors in parallel or in series.

Typical hydrotreating process conditions useful in the invention include, but are not limited to, temperatures between 300° and 450° C., hydrogen pressures between 25 and 200 bar, $H_2$:oil ratios between 150 and 1500 Nl/l, and space velocities ($hr^{-1}$) between 0.1 and 5. In one embodiment of the invention, the operating conditions for metal containing hydrocarbon feedstock desulfurization process include a reaction zone temperature of 350° C. to 400° C., a pressure of 100 to 200 bar, and a hydrogen feed rate of 300 to about 1000 normal liters per liter of oil feed.

To further illustrate the present invention and the advantages thereof, the following specific examples are given. The examples are given as specific illustrations of the claimed invention. It should be understood, however, that the invention is not intended to be limited to the specific details set forth in the Examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Five catalysts (Catalysts A, B, C, D and E) were prepared and their performance evaluated. The R value of the catalysts in the examples were calculated as described in hereinabove.

Example 1

An alumina pseudoboehmite powder (prepared using the method as disclosed and described in U.S. Pat. No. 4,154,812) was peptized by mixing with an aqueous solution of nitric acid in a batch mixer. The wet mix was extruded through buttons with nominal hole diameter of 1.3 mm. The extruded base particles were dried at 120° C., and then calcined at 1040° C. to provide an extruded base material having an R value of 0.75.

An impregnation solution was prepared by mixing water, 75% phosphoric acid, molybdenum trioxide, and 13% nickel nitrate in a 0.4:1.0:0.3 ratio. The water, 75% phosphoric acid and molybdenum trioxide were added first and heated at 90° C. for 1 hour. The resulting solution was cooled below 65° C. before adding the nickel nitrate to form the final metals solution. The extruded base was impregnated with this solution at incipient wetness. The impregnated base was dried at 120° C., and then calcined at 510° C. The finished catalyst, identified as Catalyst A, had a nominal active metal content of 5 wt % Mo and 0.25 wt % Ni. Catalyst properties were as identified in Table 1 below.

Example 2

Aqueous streams of aluminum sulfate (7% $Al_2O_3$) and titanium sulfate (9% $TiO_2$) were mixed in a 9:1 ratio to form an aluminum-titanium sulfate mixture. Water (234 gallons) was added to the strike tank and heated to 63° C. and the contents of the strike tank were maintained at this temperature for the remainder of the process. Six gallons of aluminum-titanium sulfate mixture was added to the strike tank. Flows of aluminum-titanium sulfate mixture and sodium aluminate were then concomitantly added to the strike tank. The sodium aluminate flow rate was varied to maintain a constant pH of 8.6 in the strike tank. The aluminum-titanium sulfate mixture flow was stopped 50 minutes after the start of the simultaneous aluminum-titanium sulfate mixture and sodium aluminate flows. Sodium aluminate flow was reduced to 0.7 gallons per minute and turned off when a pH of 9.2 was obtained in the strike tank. The precipitated titania-alumina mix was then filtered and washed on a filter belt to remove residual sodium sulfate. The resulting filter cake was then spray dried. Dried titania-alumina powder was then used to make a catalyst support.

The alumina-titania powder (2600 g) was peptized by mixing with an aqueous solution of nitric acid (7 g nitric acid in 2900 g water) in a batch mixer. The wet mix was extruded through buttons with nominal hole diameter of 1.3 mm. The extruded base particles were dried at 120° C., and then calcined at 1040° C. to give an extruded base material having an R value of 1.33.

An impregnation solution was prepared by mixing water (1500 g), 75% phosphoric acid (170 g), molybdenum trioxide (400 g), and 13% nickel nitrate (100 g). The water, 75% phosphoric acid and molybdenum trioxide were added first and heated at 90° C. for 1 hour. The resulting solution was cooled below 65° C. before adding the nickel nitrate to form the final metals solution. The extruded base was impregnated with this solution at incipient wetness. The impregnated base was dried at 120° C., and then calcined at 510° C. The finished catalyst, identified as Catalyst B, had a nominal titania content of 3 wt %, and a nominal metal content of 5 wt % Mo and 0.25 wt % Ni. Catalyst properties were as identified in Table 1 below

Example 3

Alumina power was prepared as described in Example 1 above. The alumina powder (2650 g) was mixed with a powder of fumed titania (100 g) and peptized by mixing with an aqueous solution of nitric acid (10 g nitric in 2800 g water) in a batch mixer. The wet mix was extruded through buttons with nominal hole diameter of 1.3 mm. The extruded base particles were dried at 120° C., and then calcined at 1000° C. to provide an extruded base material having an R value of 0.93.

An impregnation solution was prepared by mixing water (1500 g), 75% phosphoric acid (170 g), molybdenum trioxide (400 g), and 13% nickel nitrate (100 g). The water, 75% phosphoric acid and molybdenum trioxide were added first and heated at 90° C. for 1 hour. The resulting solution was cooled below 65° C. before adding the nickel nitrate to form the final metals solution. The extruded base was impregnated with this solution at incipient wetness. The impregnated base was dried at 120° C., and then calcined at 510° C. The finished catalyst, identified as Catalyst C, had a nominal titania content of 5 wt %, and a nominal metal content of 5 wt % Mo and 0.25 wt % Ni. Catalyst properties were as identified in Table 1 below.

Example 4

A dried alumina powder was prepared as described in Example 1 above. The alumina powder (2700 g) was mixed with an aqueous solution of nitric acid (28 g) titanium sulfate (80 g) and water (2550 g) in a batch mixer. The wet mix was extruded through buttons with nominal hole diameter of 1.3 mm. The extruded particles were dried at 120° C., and then calcined at 1000° C. to provide an extruded base material having an R value of 0.58.

An impregnation solution was prepared by mixing water (1500 g), 75% phosphoric acid (170 g), molybdenum trioxide (400 g), and 13% nickel nitrate (100 g). The water, 75% phosphoric acid and molybdenum trioxide were added first and heated at 90° C. for F hour. The resulting solution was cooled below 65° C. before adding the nickel nitrate to form the final metals solution. The extruded base was impregnated with this solution at incipient wetness. The impregnated base was dried at 120° C., and then calcined at 510° C. The finished catalyst, identified as Catalyst D, had a nominal active metal content of 5 wt % Mo and 0.25 wt % Ni and 0.5 wt % titania. Catalyst properties were as identified in Table 1 below.

TABLE 1

Catalyst Properties of Catalysts A-D

|  | Catalyst A | Catalyst B | Catalyst C | Catalyst D |
| --- | --- | --- | --- | --- |
| Titania Content, wt % | 0 | 3 | 5 | 0.5 |
| SA, m2/g | 107 | 100 | 116 | 121 |
| PV, cm3/g | 0.76 | 0.78 | 0.87 | 0.83 |
| PSD, vol % |  |  |  |  |
| <100 Å | 0.6 | 0.0 | 0.0 | 0.2 |
| 100-200 Å | 23.2 | 2.6 | 17.6 | 21.4 |

TABLE 1-continued

Catalyst Properties of Catalysts A-D

|  | Catalyst A | Catalyst B | Catalyst C | Catalyst D |
|---|---|---|---|---|
| 200-500 Å | 47.2 | 81.0 | 49.7 | 53.9 |
| >500 Å | 29.0 | 16.4 | 32.7 | 24.3 |
| >1,000 Å | 23.0 | 13.0 | 21.4 | 17.6 |

Example 5

A catalyst, Catalyst E, was prepared as described in Example 2, with the exception that the base was calcined at a low temperature of 600° C. The pore structure of the catalyst was outside of the pore size distribution of the invention. Catalyst properties of Catalyst E and catalysts as disclosed in Rocha et al. are shown in Table 2 below. Catalyst E had an R value of 0.11.

TABLE 2

Properties of Catalyst E

|  | Catalyst E |
|---|---|
| SA, m2/g | 235 |
| PV, cm3/g | 0.67 |
| PSD, vol % |  |
| <50 Å | 4.0 |
| 50-100 Å | 51.0 |
| 100-200 Å | 43.4 |
| 200-500 Å | 1.2 |
| >500 Å | 0.6 |

Example 6

Catalysts A, B, C, D and E were tested in a hydrotreating process as described hereinafter. The catalyst pellets were loaded in a plug-flow reactor. The feed consisted of an atmospheric resid and hydrogen. The resid had a metal content of 362 ppm V and 71 ppm Ni, a sulfur content of 4.6 wt %, and content in Micro-Carbon Residue (MCR) of 16.6 wt %. The reactor temperature was maintained at 378° C., and the average hourly space velocity was 0.75 L/(L.h). The reaction product was collected in 24-hours aliquots and analyzed for its content in metals, Sulfur and MCR. Comparative results for metals, sulfur and MCR conversion are given in Table 3 below. The results are given at three different time-on-stream (TOS) values (209, 401, and 785 hours).

TABLE 3

Catalyst Testing Results

| | Vanadium conversion, % | | | Nickel conversion, % | | | Sulfur conversion, % | | | MCR conversion, % | | |
|---|---|---|---|---|---|---|---|---|---|---|---|---|
| | 209 h | 401 h | 785 h | 209 h | 401 h | 785 h | 209 h | 401 h | 785 h | 209 h | 401 h | 785 h |
| Catalyst A | 65.5 | 64.2 | 62.3 | 45.5 | 45.6 | 48.3 | 35.8 | 33.5 | 37.3 | 22.7 | 23.9 | 24.8 |
| Catalyst B | 73.6 | 71.3 | 69.5 | 50.9 | 52.5 | 52.5 | 38.6 | 37.1 | 39.1 | 27.1 | 25.9 | 27.5 |
| Catalyst C | 68.8 | 67.8 | 65.0 | 48.1 | 48.8 | 48.8 | 36.2 | 36.4 | 44.2 | 23.3 | 23.3 | 25.7 |
| Catalyst D | 67.7 | 66.8 | 66.0 | 48.1 | 49.0 | 51.6 | 35.9 | 33.7 | 38.1 | 23.7 | 24.9 | 27.5 |
| Catalyst E | 60.0 | 54.5 | 24.1 | 38.1 | 40.5 | 17.0 | 68.6 | 66.1 | 16.6 | 38.6 | 36.0 | 12.5 |

As can be seen in Table 3 above, Catalysts B, C and D, being promoted with titania in differing amounts and having a pore structure according to the present invention, exhibit a higher metal conversion than Catalyst A which contained no titania. At the same time, the sulfur and MCR conversion of invention Catalysts B, C and D increased when compared to the sulfur and MCR conversion obtained using Catalyst A. The low temperature calcined Catalyst E contained 3 wt % titania and had a pore structure outside of the desired pore structure of the invention. As can be seen in the Table 4 above, the performance of Catalyst E to remove metals was inferior to the performance of invention catalysts (Catalysts B, C, and D). Further, while Catalyst E exhibited an initial superior performance for conversion of sulfur and MCR when compared to the invention Catalysts B, C and D, the performance of Catalyst E for conversion of metals, sulfur and MCR unexpectedly declined sharply over time evidencing a lack of stability. Such a lack of stability would not be desirable in the commercial refining of heavy hydrocarbon feeds with high content of metals.

Reasonable variations, modifications and adaptations of the invention can be made within the scope of the described disclosure and the appended claims without departing from the scope of the invention.

The invention claimed is:

1. A process for preparing a porous support material for supporting catalytically active metals suitable for the hydrodemetallation of heavy hydrocarbon fractions containing metals under hydrotreating conditions, which process comprises
    (a) preparing an extrudable titania alumina having about 0.3 to about 1.0 wt % titania, based on the total weight of the titania alumina;
    (b) optionally, peptizing the titania alumina;
    (c) extruding the titania alumina to form a titania alumina extrudate; and
    (d) calcining the extrudate at a temperature ranging from about 960° C. to 1050° C. to obtain a calcined support wherein the support has a total pore volume in the range of from about 0.7 to about 1.2 cubic centimeters per gram, with greater than 40% of the total pore volume having pores in a diameter larger than 200 Å, about 30% or greater of the total pore volume having pores in the range of about 200 Å to about 500 Å and, greater than 10% of the total pore volume having pores with a diameter above 1000 Å and wherein the support comprises titania alumina having about 0.3 to about 1.0 wt % based on the total weight of the titania alumina wherein the titania alumina of the support comprises at least 90 wt % alumina having an R value of from about 0.4 to about 1.7, wherein R is the ratio between the integrated intensity of the X-ray diffraction peak at 2Θ=32° and the integrated intensity of the X-ray diffraction peak at 2Θ=46°.

2. The process of claim 1 wherein the alumina-titania of step (a) is formed by:
   (i) co-precipitating aluminum sulfate and titanium sulfate with sodium aluminate while using an amount of titanium sulfate sufficient to provide a final support comprising titania alumina having about 0.3 to about 1.0 wt % titania; or
   (ii) mixing alumina and an amount of titania sufficient to provide a support comprising titania alumina having about 0.3 to about 1.0 wt % titania based on the total weight of the titania alumina; or
   (iii) impregnating an alumina powder with a titanium compound in an amount sufficient to provide a support comprising titania alumina having about 0.3 to about 1.0 wt % titania based on the total weight of the titania alumina.

3. The process of claim 1 wherein the support is calcined at a temperature ranging from about 980° C. to about 1040° C.

4. A catalyst support comprising a titania alumina having about 0.3 to about 1.0 wt % titania based on the total titania alumina, said support having a total pore volume in the range of about 0.7 to about 1.2 cc/g, and a pore volume distribution such that greater than 40% of the total pore volume have pores in a diameter larger than 200 Å, about 30% or greater of the total pore volume have pores in the range of about 200 Å to about 500 Å and, greater than 10% of the total pore volume have pores with a diameter above 1000 Å
   wherein the titania alumina of the support comprises at least 90 wt % alumina having an R value of from about 0.4 to about 1.7, wherein R is the ratio between the integrated intensity of the X-ray diffraction peak at 2Θ=32° and the integrated intensity of the X-ray diffraction peak at 2Θ=46°.

5. The support of claim 4 wherein pore volume distribution of the support is selected from the group consisting of: from about 50% to about 90% of the total pore volume is in pores having a diameter larger than 200 Å; from about 30% to about 80% of the total pore volume is in pores having a diameter from about 200 to about 500 Å; greater than 15% of the total pore volume of the support have pores in a diameter above 1000 Å; and combinations thereof.

6. The support of claim 4, wherein the pore volume and pore size distribution properties are determined by mercury penetration porosimetry using a mercury porosimeter at a pressure range from about atmospheric pressure to about 4,000 bar, with a contact angle, θ=140° and a mercury surface tension of 0.47 N/m at 25° C.

7. A method for preparing a catalyst having high activity and stability for hydrodemetallation of metal-containing heavy hydrocarbon fractions in a hydrotreating process, which method comprises impregnating a porous extruded support with an aqueous solution containing at least one catalytic agent or catalytic agent precursor comprising:
   (i) at least one metal selected from Group 6 of The Periodic Table; and
   (ii) at least one metal selected from the group consisting of a metal of Group 9 of The Periodic Table; and a metal of Group 10 of The Periodic Table; and combinations thereof; and optionally phosphorous,
   said agents being thermally decomposable to the metal oxides, and thereafter drying and calcining the resulting impregnated support to provide a supported catalyst, said support having been prepared by the process of claim 2.

8. A catalyst having improved activity and stability in the hydrodemetallation of heavy hydrocarbons, comprising:
   (a) an extruded alumina support comprising titania alumina having about 0.3 to about 1.0 wt % titania based on the total weight of the titania alumina; and
   (b) a catalytic agent or catalytic agent precursor comprising:
      (i) at least one metal from Group 6 of The Periodic Table; and
      (ii) at least one metal selected from the group consisting of a metal of Group 9 of The Periodic Table; a metal of Group 10 of The Periodic Table, and combinations thereof;
   and optionally phosphorous;
   wherein the support has a surface area ranging from about 50 to about 150 m²/g, and a total pore volume in the range of from about 0.7 to about 1.2 cubic centimeters per gram, with greater than 40% of the total pore volume having pores in a diameter larger than 200 Å, about 30% or greater of the total pore volume having pores in the range of about 200 Å to about 500 Å and, greater than 10% of the total pore volume having pores with a diameter above 1000 Å
   wherein the calcined support comprises titania alumina comprising at least 90 wt % alumina having an R value of from about 0.4 to about 1.7, wherein R is the ratio between the integrated intensity of the X-ray diffraction peak at 2Θ=32° and the integrated intensity of the X-ray diffraction peak at 2Θ=46°.

9. The catalyst of claim 8 wherein said at least one catalytic agent or catalytic agent precursor comprises a metal selected from the group consisting of: cobalt, nickel, molybdenum, and combinations thereof; and optionally phosphorous.

10. The catalyst of claim 8 wherein pore volume distribution of the support is selected from the group consisting of: from about 50% to about 90% of the total pore volume of the support is in pores having a diameter larger than 200 Å; from about 30% to about 80% of the total pore volume is in pores having a diameter from about 200 to about 500 Å; greater than 15% of the total pore volume of the support have pores in a diameter above 1000 Å; and combinations thereof.

11. A process for hydrotreating a heavy hydrocarbon feed containing at least one of metals, sulfur and microcarbon residue to reduce the content or to remove at least one of said metals, sulfur and microcarbon residue, which process comprises contacting said heavy hydrocarbon feed with a catalyst of claim 8 under hydrotreating process conditions comprising a reaction temperature ranging from about 300° to about 450° C., a hydrogen pressure of about 25 to about 200 bar, a $H_2$:oil ratio ranging from about 150 to about 1500 Nl/l, and a space velocity from about 0.1 to 5 $h^{-1}$.

12. The process of claim 11 wherein the heavy hydrocarbon feed contains a metal selected from the group consisting of nickel, vanadium and combinations thereof.

13. The catalyst of claim 8 wherein the pore volume and pore size distribution properties of the support are determined by mercury penetration porosimetry using a mercury porosimeter at a pressure range from about atmospheric pressure to about 4,000 bar, with a contact angle, θ=140° and a mercury surface tension of 0.47 N/m at 25° C.

\* \* \* \* \*